(12) United States Patent
Arnold

(10) Patent No.: US 8,984,672 B2
(45) Date of Patent: Mar. 24, 2015

(54) VISOR PROVIDED WITH A UV-SENSITIVE MATERIAL

(75) Inventor: Derek Leslie Arnold, Emmeloord (NL)

(73) Assignee: Pinlock Patent B.V., Lelystad (NL)

( * ) Notice: Subject to any disclaimer, the term of this patent is extended or adjusted under 35 U.S.C. 154(b) by 973 days.

(21) Appl. No.: 12/520,722

(22) PCT Filed: Dec. 19, 2007

(86) PCT No.: PCT/NL2007/050672
§ 371 (c)(1),
(2), (4) Date: Oct. 30, 2009

(87) PCT Pub. No.: WO2008/075953
PCT Pub. Date: Jun. 26, 2008

(65) Prior Publication Data
US 2012/0047637 A1  Mar. 1, 2012

(30) Foreign Application Priority Data
Dec. 21, 2006  (NL) ..................................... 1033103

(51) Int. Cl.
*A42B 1/08*  (2006.01)
*A42B 3/22*  (2006.01)
*G02B 5/23*  (2006.01)

(52) U.S. Cl.
CPC .. *A42B 3/226* (2013.01); *G02B 5/23* (2013.01)
USPC .......................................................... 2/424

(58) Field of Classification Search
USPC ......... 2/9, 410, 411, 413, 205, 424, 425, 426; 350/354
See application file for complete search history.

(56) References Cited

U.S. PATENT DOCUMENTS

| | | | | |
|---|---|---|---|---|
| 3,311,922 A | * | 4/1967 | Bezzerides | 2/8.1 |
| 4,047,249 A | * | 9/1977 | Booth | 2/10 |
| 4,070,712 A | * | 1/1978 | Marwitz | 2/10 |
| 4,101,980 A | * | 7/1978 | Stepan et al. | 2/9 |
| 4,152,846 A | * | 5/1979 | Witt | 434/36 |
| 4,567,122 A | * | 1/1986 | Baldry et al. | 430/4 |
| 4,663,785 A | * | 5/1987 | Comparetto | 2/413 |
| 4,718,127 A | * | 1/1988 | Rittmann et al. | 2/424 |
| 5,014,366 A | * | 5/1991 | Discipio, Sr. | 2/424 |
| 5,177,509 A | | 1/1993 | Johansen et al. | |
| 5,652,964 A | * | 8/1997 | Reinheardt | 2/424 |
| 5,671,483 A | * | 9/1997 | Reuber | 2/424 |
| 5,687,427 A | * | 11/1997 | Lamattina et al. | 2/424 |
| 5,724,187 A | * | 3/1998 | Varaprasad et al. | 359/608 |
| 5,765,235 A | * | 6/1998 | Arnold | 2/424 |
| 5,991,072 A | * | 11/1999 | Solyntjes et al. | 359/361 |

(Continued)

FOREIGN PATENT DOCUMENTS

| | | |
|---|---|---|
| DE | 200 12 300 | 11/2000 |
| EP | 0 250 193 A2 | 12/1987 |

(Continued)

*Primary Examiner* — Richale Quinn
(74) *Attorney, Agent, or Firm* — Oblon, McClelland, Maier & Neustadt, L.L.P.

(57) ABSTRACT

There is disclosed a visor comprising at least one transparent plate, in which or on which a light-sensitive material is provided, which material has the property of transmitting less light as more light is incident thereon. In particular UV light-intensity-activated, UV light-blocking pigments, photochromatic pigments are used in the light-sensitive material. The light-sensitive material, which may be fixedly or detachably provided on the transparent plate, is transparent in the deactivated condition thereof.

7 Claims, 3 Drawing Sheets

(56) References Cited

U.S. PATENT DOCUMENTS

| | | | |
|---|---|---|---|
| 5,997,139 A * | 12/1999 | Yasuda | 351/49 |
| 6,006,366 A * | 12/1999 | Vondrak | 2/424 |
| 6,113,813 A | 9/2000 | Goudjil | |
| 6,138,286 A * | 10/2000 | Robrahn et al. | 2/436 |
| 6,161,225 A * | 12/2000 | Arai | 2/424 |
| 6,220,703 B1 * | 4/2001 | Evans et al. | 351/159.56 |
| 6,381,750 B1 * | 5/2002 | Mangan | 2/10 |
| 6,388,813 B1 * | 5/2002 | Wilson et al. | 359/630 |
| 6,405,373 B1 * | 6/2002 | Grau | 2/15 |
| 6,615,409 B2 * | 9/2003 | Youmans et al. | 2/432 |
| 6,640,346 B2 * | 11/2003 | Dufresne | 2/424 |
| 6,847,492 B2 * | 1/2005 | Wilson et al. | 359/642 |
| 6,944,887 B2 * | 9/2005 | Heine et al. | 2/424 |
| 7,002,744 B2 * | 2/2006 | Evans et al. | 359/487.02 |
| 7,184,217 B2 * | 2/2007 | Wilson et al. | 359/630 |
| 2003/0110552 A1 * | 6/2003 | Youmans et al. | 2/426 |
| 2003/0214080 A1 | 11/2003 | Maki et al. | |
| 2004/0246437 A1 | 12/2004 | Ambler et al. | |
| 2006/0010572 A1 * | 1/2006 | Douglas | 2/231 |
| 2006/0023160 A1 * | 2/2006 | Cartier et al. | 351/159 |
| 2007/0271686 A1 * | 11/2007 | Rast | 2/410 |
| 2009/0135369 A1 * | 5/2009 | Burnstein | 351/52 |
| 2009/0293165 A1 * | 12/2009 | Arnold | 2/15 |

FOREIGN PATENT DOCUMENTS

| | | |
|---|---|---|
| GB | 2 352 961 | 2/2001 |
| GB | 2 368 260 | 5/2002 |
| GB | 2 370 972 | 7/2002 |
| WO | 02 18986 | 3/2002 |
| WO | WO 2005/023529 A2 | 3/2005 |

* cited by examiner

VISOR PROVIDED WITH A UV-SENSITIVE MATERIAL

The present invention relates to a visor comprising at least one transparent plate.

The present invention further relates to a helmet provided with such a visor.

Such a visor, for example for a helmet, a window, goggles or another surface is generally known. Furthermore, visors are known for use in, for example, windows of cars, ships, etc, and for helmets, for example for motorcyclists, pilots and personnel of emergency services such as the police or the army, which visors are provided with a slightly tinted material so as to provide some protection, in particular against radiance and excessive sunlight, in particular against the ultraviolet or UV radiation component thereof.

A drawback of the known visors is the fact that they stop a certain amount of radiation under all conditions, also in those conditions, such as twilight, in which by nature comparatively little light is available anyhow. In such cases the known visor makes it more difficult to distinguish objects and reduces visibility, which has an adverse effect on traffic safety.

The object of the present invention is to provide a visor which contributes more to traffic safety and which has optical properties which are optimal for the user in all light conditions.

In order to accomplish that object, the visor according to the invention is characterised in that a light-sensitive material is present in or on the transparent plate, which material has the property of transmitting less light as the amount of light incident thereon increases.

The advantage of the visor according to the invention is that, unlike the known visor, it does not block a fixed amount of radiation, but that its ability to transmit light automatically varies in such a way that less light is transmitted to the user's eyes as more light is incident on the part of the transparent light that comprises the light-sensitive material. In practice the aim is to allow a specific amount of light to reach the eye, irrespective of the actual amount of light incident on the outer side of the visor, which specific amount is optimally geared to the average or, if desired, the individual properties of the human eye as regards the sensitivity to light thereof.

In addition to that it is advantageous that because of the use of the present invention, it is no longer necessary to buy and fit a separate dark visor to replace the transparent visor.

The light-sensitive material may advantageously be provided permanently in or on the transparent plates, for example be integrated therewith. According to another possibility, however, the light-sensitive material may also be provided on the plate in a non-permanent manner, i.e. detachably or removably.

One embodiment of the visor according to the invention is characterised in that the material has the property that less visible and/or UV light is transmitted as more light and/or UV light is incident thereon.

The materials, which generally have a single colour, have the property that they are light-sensitive and capable of regulating the amount of light and/or special UV light they transmit, or that they are sensitive in particular to UV light and are thus capable of regulating the amount of light and/or special UV light they transmit.

In another embodiment, the light-sensitive material is for financial (cost price) reasons preferably provided only on or in a field of vision or viewing portion of said at least one transparent plate, on or in a suitable side or otherwise thereof.

A preferred embodiment of the visor according to the invention is characterised in that the transparent plate and/or the light-sensitive material comprises a plastic, in particular a flexible, usually pre-bent plastic, such as polycarbonate.

Said polycarbonate plastic is interesting for financial (price) reasons, but in addition to that it is easy to bend manually, so that several (in particular non-permanent) types of fastening means and methods become practically feasible. This is important with a view to realising the adaptations to previously sold helmets that consumers may require, so that said consumers can provide said helmets with light-sensitive features themselves, i.e. for the so-called after-sales markets and for do-it-yourself kits. For the so-called OEM (Original Equipment Manufacturers) market especially the permanent variant, which has already been pre-bent at the factory, is advantageous.

Further advantageous embodiments of the visor and the helmet according to the present invention are defined in the other claims.

The visor and the helmet according to the present invention will now be explained in more detail with reference to the figures below, in which like parts are provided with the same numerals. In the drawing.

Figure 1A:
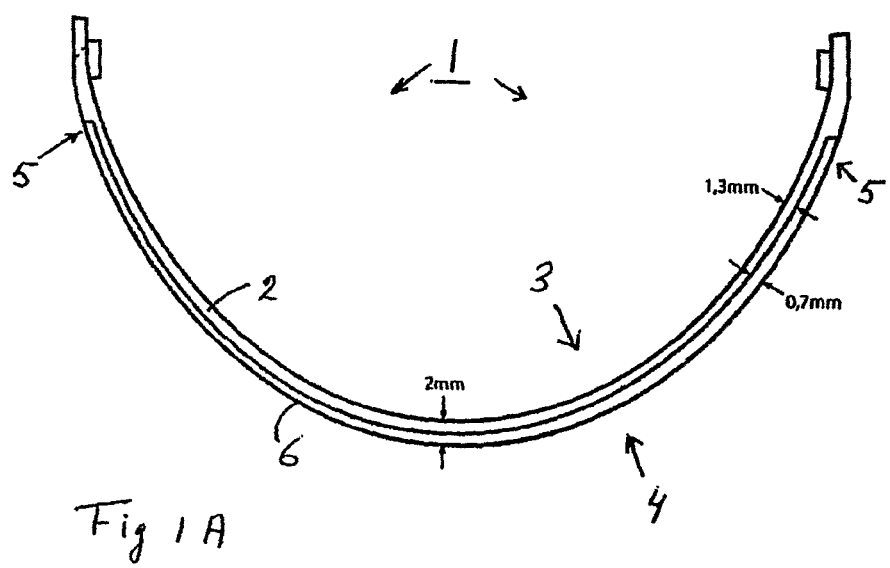
FIGS. 1A and 1B are top plan views of embodiments of visors according to the present invention which are provided with a permanent layer of a photo-sensitive material, which visors can be manufactured in various ways.
Figure 1B:
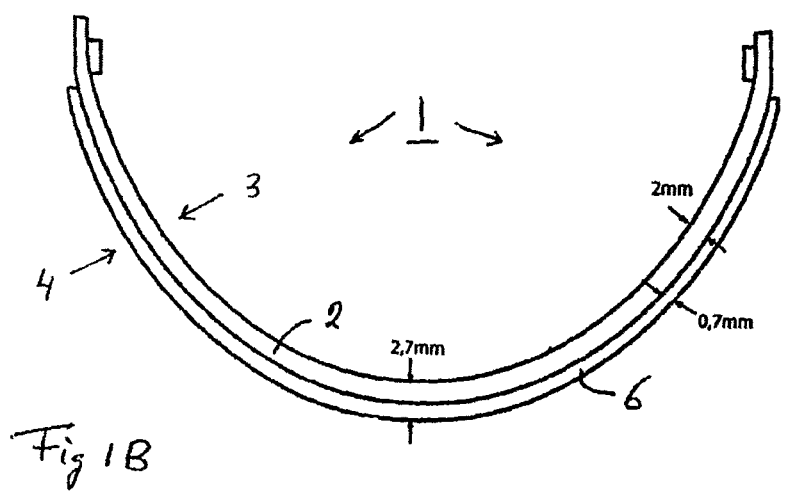

FIGS. 1A and 1B each show a top plan view of a shield or visor 1, which usually protects the face, which can be detachably or undetachably connected to a helmet, a mask or generally a head covering (not shown). The visor 1 comprises a transparent plate 2, which is bent in FIGS. 1A and 1B, generally a two- or three-dimensionally bent plate, which plate, when used on a helmet, will usually be made of a flexible, transparent plastic, such as polycarbonate, by thermal moulding or injection-moulding. The plate 2 has an inner side 3, which faces towards the helmet or the user, and an outer side 4.

In the embodiment that is shown in FIG. 1A, a recess 5 has been formed in the outer side 4, the depth of said recess being equal to the thickness of the layer 6 of a light-sensitive material (yet to be explained hereinafter), so that the surface at the front side of the visor 1 is flat, which reduces the occurrence of local turbulences, which may be accompanied by objectionable whistling sounds or noise while riding. If desired, the layer 6 may merge into a sun visor in outward direction. When the polycarbonate is being injection-moulded, the pre-formed layer of material 6 can be melted in place in the recess 5. The advantage of this is that no water or moisture can penetrate between the various layers, which are thus closely packed together, but that there will be no trapped air bubbles, either, so that light can reach the eye without any optical interference.

The recess is preferably limited to an effective field of vision or viewing portion of the plate 2. If desired, a motorcyclist can look past said portion when there is not enough light available temporarily, for example upon driving into a tunnel.

In the embodiment of FIG. 1B, too, the layer 6 of light-sensitive material is permanently provided on the outer side 4 of the transparent plate 2. In this embodiment the layer 6 of material, which preferably has a minimum thickness of only 0.5 mm, has been applied to the plate 2 during or after the injection-moulding process, in the latter case by means of a suitable vacuum technique. In view of the cost price of the light-sensitive material, which material will be explained hereinafter, the dimensions of the layer 6 of material will be limited to those of the field of vision or viewing portion of the plate 2.

Suitable ways of permanently combining the plate 2 and the layer 6 are: injection moulding or casting, thermal moulding, gluing or laminating.

As regards said laminating, the photosensitive material may also be laminated between two transparent layers of plastic material, preferably polycarbonate. Usually this takes place by means of a combination of a thermal treatment and a pressure treatment, followed by a treatment in a furnace so as to realise the desired two- or three-dimensional shape. Said sandwich will have a thickness of about 0.5 mm in that case, comprising two polycarbonate layers each having a thickness of 0.2 mm, between which a laminate or glue is provided in a thickness of 0.1 mm. In this way very little of the costly photosensitive material is used in the intermediate layer, which is advantageous.

Figure 2A:
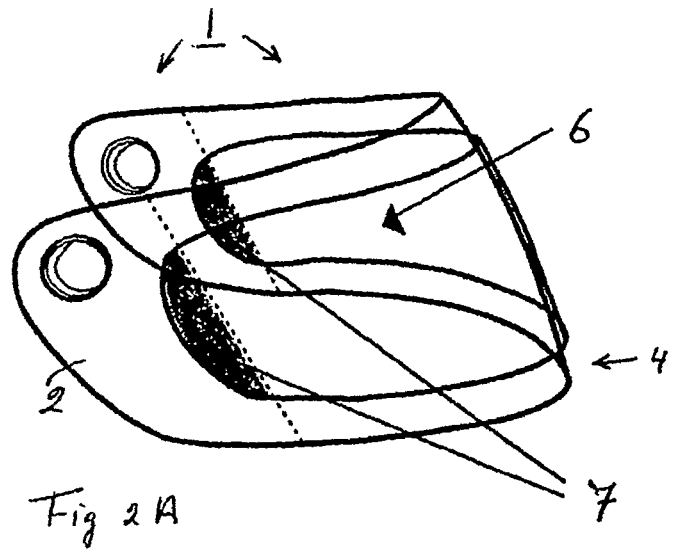
FIGS. 2A, 2B and 2C show examples of visors on which the photosensitive layer is removably provided.
Figure 2B:
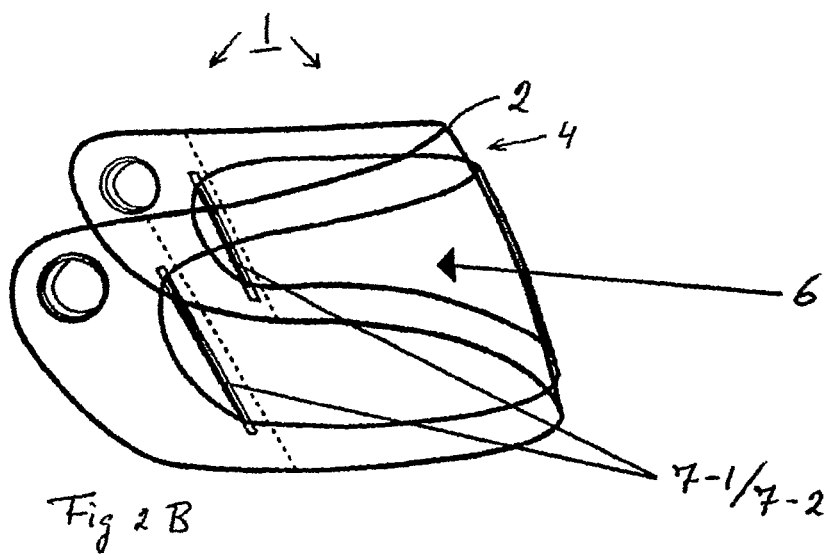
Figure 2C:
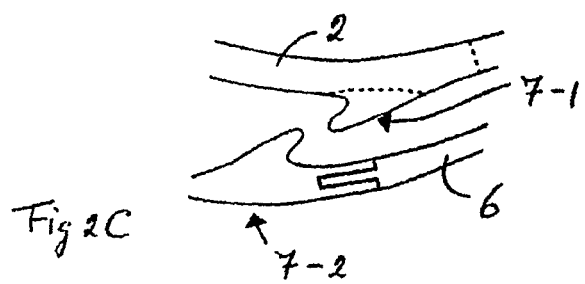

FIGS. 2A, 2B and the detail of FIG. 2C show embodiments in which the layer 6 of photosensitive material, possibly in the form of a laminate or a film, is detachably provided on the outer side 4 of the transparent plate 2. The visor 1 is provided with fastening means 7 in that case, for example in the form of a clamp, tension, snap, clip, pin, or magnet fastening system, or of single- or double-sided adhesive means. An example of this is shown in FIG. 2A, in which Velcro 7 is affixed to the plate 2 and the layer 6 of photosensitive material. In the embodiment of FIG. 2B, this manner of attachment is combined with a snap connection 7-1, 7-2 as shown in more detail in FIG. 2C, which is connected or moulded to the layer 6 and which makes it possible to detach the layer 6 from the plate 2.

In an embodiment that is not shown in the figures, the embodiment of FIG. 2A is provided with Velcro in several places, and holes may have been formed both in the plate 2 and in the layer 6, if desired, for receiving the pins, thus making it possible to detach the layer 6 from the plate 2. The plate 2 may in turn be detachable or pivotable with respect to the helmet, as the embodiment of FIG. 3A (yet to be explained) shows. Important is in any case that the layer which comprises the photosensitive material is detachable and that the layer 6 can be secured to the plate 2 with sufficient mechanical tension. To that end clamping means may be provided, which may be eccentric and rotatable, for example, and to which the layer 6 is connected, which layer can subsequently be pulled tight on the plate 6 under tension, for example by rotating a pin.

Figure 3A:
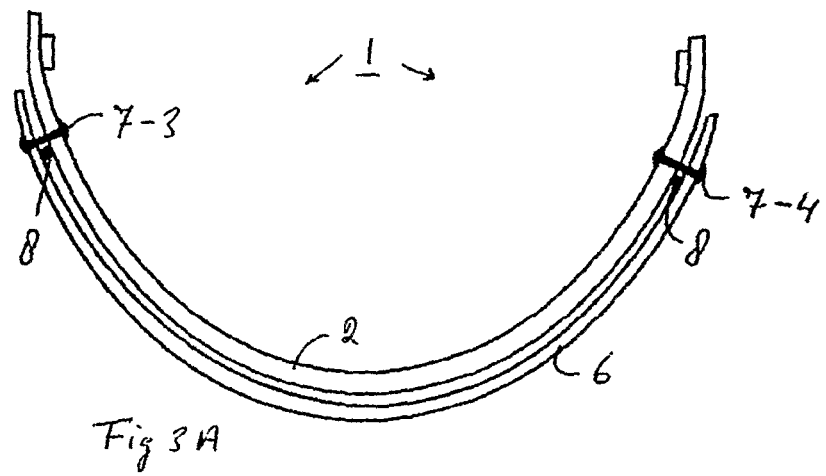
FIGS. 3a and 3b are top plan views of further embodiments of the detachable visor, in which the photosensitive layer is spaced from the transparent plate by a short distance in the assembled condition of the visor.
Figure 3B:
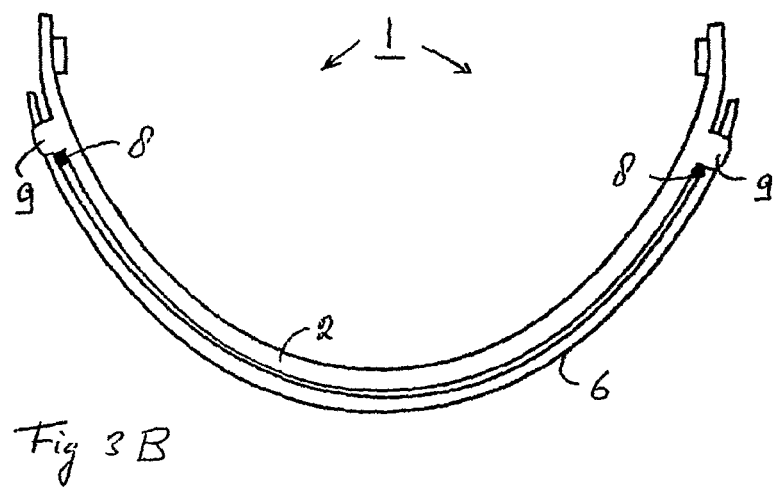

FIGS. 3A and 3B are top plan views of two embodiments of the visor 1, in which the layer 6 of photosensitive material is kept spaced from the transparent plate 2 by a short distance by means of pins 7-3 and 7-4 (FIG. 3A). Present between the plate 2 and the layer 6, in particular round the pins 7-3 and 7-4, is an elastic element 8, for example in the form of a ring, which, in compressed condition, exerts a pressure on the plate 2 and the layer 6, thus ensuring water-tightness around the pins. The element 8, which functions as a spacer between the transparent plate 2 and the photosensitive layer 6, is preferably configured as a dry, non-adhesive, flexible silicone seal which may extend over at least part, possibly even the whole, of the circumferential edges of the photosensitive layer 6. This achieves that the visor 1 is water-tight all around, whilst the flexible seal prevents the occurrence of mechanical point loads by distributing the tensions.

In the embodiment that is shown in FIG. 3A, separable pins, i.e. pins that can be detached from each other, for example configured with male and corresponding female connecting elements, make it possible to detach the layer 6 from the plate 2. The flexible, dry, transparent element 8 prevents the ingress of air, water, moisture and dirt in that case and prevents the plate 2 and the layer 6 from moving undesirably relative to each other under the influence of the wind when driving.

In the embodiment that is shown in FIG. 3B, the layer 6 is detachably provided on an extension 9 of the transparent plate 2. The element 8, which forms a practically cured silicone seal in that case, on the one hand maintains a certain spacing between the plate 2 and the layer 6 in that case, also when the wind exerts a pressure force on the layer 6 when driving, whilst on the other hand said element 8 thus prevents the plate 2 and the layer 6 from flapping and beating together, so that there will be no damage and/or wear. The use of the silicone seal furthermore prevents the occurrence of so-called Newton rings.

In the case of the non-permanent, i.e. detachable or removable variants it is generally not necessary to buy a new helmet or a new visor and nevertheless benefit from the light-sensitivity. After all, the existing helmet may be fitted with a new visor exhibiting the light-sensitive characteristic, or the old visor may be exchanged for the new visor temporarily or permanently. Not only does this have a cost-saving effect, but it also leads to less wear, because it is possible in that case to use the new visor only in situations in which the rider considers this necessary in view of the weather conditions. Possibly, a permanent layer of light-sensitive material may be provided once-only on the visor 1 by means of foam or acrylic tape in the field of vision of an existing visor 1. The light-sensitive, in particular UV-sensitive layer 6 comprises (photochromatic) pigments, which have the property that they are photosensitive and regulate the amount of light transmitted, especially UV light, in dependence on the amount of visible light and/or UV light incident thereon. In that case the layer 6 is transparent in unexposed, deactivated condition. In particular UV light-intensity-activated, light-blocking pigments are commercially available. For example, to form the layer 6, a pigment mixed with a suitable liquid is applied to a transparent substrate or is integral with the substrate itself, or a pigment-containing film is glued to the substrate, or the pigment or pigment mixture is mixed with the glue itself in a laminating process. The properties of the layer 6 of photosensitive material to be finally obtained must meet the stringent European Public Road Safety Regulations.

A pigment which is suitable for use in the visor 1 is a so-called "base grey" pigment, which consists of three mixed base colour, light-sensitive pigments. In non-UV-activated condition the light transmission thereof is at least 90%, and it meets all the safety regulations for a safe use also at night or when unexpectedly driving into a badly lit or unlit tunnel. The pigment layer that regulates the transmission of light above 380 nm is preferably minimally 0.1 mm thick, it may for example be sandwiched between two polycarbonate layers, each preferably having a thickness of minimally 0.1 mm. Polycarbonate is easy to extrude and process in an injection-moulding process. The layer 6 of light-sensitive material thus built up of three layers is easy to form to precisely the required dimensions and shape. This may be done mechanically, but also by the aforesaid thermal moulding, using heat and pressure. It stands to reason that combination possibly with other plastics in a laminating-bonding process is possible, in which case the pigment powder is mixed in an amount that matches the desired light-blocking specifications and which, for cost-saving reasons, will be provided only in the field of vision or viewing portion of the visor 1.

On the outer side, the visor 1 may be provided with a, preferably water-repellent, anti-scratch film applied to the outer side of the layer 6 of photosensitive material. Furthermore, means which are known per se may be used on the visor 1, for example to prevent parts of the visor from misting up or becoming moist.

The helmet and the visor 1 are each provided with length-adjustable connecting means, which are known per se, for being fixedly or detachably connected together.

Apart from the above-explained sandwich variant and the variant in which the pigment or the pigments are incorporated in the plastic or the polycarbonate, the UV-sensitive or light-sensitive material 6 must be provided on the outer side of the visor 1, as it would otherwise take too long for the material to adapt its transparency in case of a change in the amount of light incident thereon, which might lead to unsafe situations. It is for that reason that the material is intentionally not provided on the inner side of the visor 1.

The invention claimed is:

1. A visor comprising:
    at least one curved transparent plate having a convex outer side and a concave inner side;
    a photochromic material layer, the photochromic material layer being detachably mounted on the transparent plate, wherein the photochromic material layer is provided at the convex outer side of the transparent plate; and
    a seal element which seal element is provided at a location to maintain a certain spacing between the transparent plate and the photochromic material layer and to prevent water ingress between the two surfaces,
    wherein the photochromic material layer comprises a photochromic pigment provided between two layers of plastic and further comprising an anti-scratch coating applied at an outer side of the photochromic material layer.

2. A visor according to claim 1, wherein the photochromic material layer has the property that less visible and/or UV light is transmitted through the photochromic material layer as more light and/or UV light is incident thereon.

3. A visor according to claim 1, wherein the photochromic material layer is provided on or within at least part of a field of vision or viewing portion of said plate.

4. A visor claim 1, wherein at least one of the transparent plate and the photochromic material layer comprises polycarbonate.

5. A visor according to claim 1, further comprising a fastener for fastening the photochromic material layer to the outer surface of the transparent plate.

6. A visor according to claim 5, wherein said fastener comprises one of: a clamp, tension, snap, clip, hook and loop, pin, or magnet fastening system, or adhesive.

7. A visor according to claim 1, wherein the anti-scratch coating is water repellent or prevents the visor from misting up.

* * * * *